United States Patent Office 3,737,521
Patented June 5, 1973

1

3,737,521
FORMULATION FOR SUSTAINED RELEASE OF A BIOLOGICAL AGENT
John W. Born, Brecksville, Ohio, assignor to The B. F. Goodrich Company, New York, N.Y.

No Drawing. Filed Dec. 9, 1970, Ser. No. 96,599
Int. Cl. A61k 27/12
U.S. Cl. 424—22 2 Claims

ABSTRACT OF THE DISCLOSURE

A unique formulation for the sustained release of active agent for medication in animals wherein the active agent is released from a solid solution or dispersion of thermoplastic polymer by diffusion or leaching.

BACKGROUND OF THE INVENTION

Subcutaneous implants are used in improving feed efficiency in cattle, sheep, pigs and fowl. Short term, accurate, sustained release of proper hormones can control breeding in cattle, sheep and the like by an implant to control ovulation. Medication can also be supplied topically to an animal by a pack adhered to the skin and by placing a supply of medication in the gastro-intestinal tract.

Prior art efforts to provide long term release of medication in the body include (1) mixing a drug with a carrier agent such as beeswax and injection thereof intramuscularly into the body, (2) containers of many types that have been designed to release medication through tiny openings when the container is placed in a body cavity. An improvement on the latter system is (3) a polymeric capsule or container holding medication in an enclosed space therein. When the capsule is implanted in a living organism, the drug diffuses from the inner reservoir through the polymer (generally an organo-polysiloxane rubber composition) wall. Method (1) often results in foreign body reaction and scar formation and the bulkiness of the carrier agent limits the amount of active agent that can be administered. In method (2) the tiny openings are often quickly plugged by body tissues. In (3), the reservoir-diffusion method, varying surface areas of the therapeutic agent are exposed to varying inner surface areas of the capsule and the rate of diffusion of therapeutic agent through the polymer surface tends to vary and be not rigidly controllable.

SUMMARY OF THE INVENTION

This invention provides a solid polymeric compound containing a physiologically active agent. The compound is compatible with tissues of living organisms when implanted therein or thereon. The polymer serves as a solid matrix for the physiologically active agent. The polymeric matrix containing the agent is flexible and not soluble in body fluids. The physiologically active agent is not present as a reservoir but is initially uniformly dispersed or dissolved throughout the polymer and then, apparently by diffusion, moves continuously to the surface of the polymer. An effective concentration of physiologically active agent is maintained at the surface of the polymer. The polymeric compound releases the physiologically active agent at a continuous effective rate from the implant surface to the body.

This invention provides a carrier means and method of implanting a physiologically active agent in an organ or region of the body for relatively slow, prolonged release of the agent at a sustained rate. Frequent injection or oral administration of the agent with attendant discomfort is not necessary to achieve a given dose. Topical and gastro-intestinal applications of medication are also possible with the carrier of this invention.

2

The implant matrix for a physiologically active agent or drug is prepared from a thermoplastic polymeric elastomer system. These thermoplastic polymers do not require vulcanization or cure to achieve elastomeric properties. Chemical compounds employed to effect cure in elastomers can be a source of reaction in an animal body and should be avoided. The useful thermoplastic polymers have number average molecular weights of at least 1,000 and show solubility in normal saline solution of less than 0.1%. A thermoplastic, essentially linear polyurethane elastomer containing essentially no reactive hydroxyl or isocyanate groups is one species of such a polymer.

Preferred polymer matrixes are substantially linear thermoplastic polyurethanes prepared by mixing any one or more of (1) an hydroxyl-terminated polyester, an hydroxyl poly(alkylene oxide), a hydroxyl polyacetal and the like, with (2) a free glycol chain extender and (3) an organic diisocyanate.

Reactant (1) of the polyurethanes employed in the practice of this invention includes hydroxyl-terminated polyesters, hydroxyl poly(alkylene oxide)s, the hydroxyl polyacetals and the like. These polymers have an essentially linear structure and a molecular weight range from about 500 to 5,000, preferably between 750 and 3,500.

The basic hydroxyl-terminated polyesters utilized are prepared by the esterification of a dicarboxylic acid such as adipic, succinic, and the like or their anhydrides, and an aliphatic glycol such as ethylene glycol, propanediol 1,4-butanediol, and the like. Preferred acids are those dicarboxylic acids of the formula HOOC—R—COOH where R is an alkylene radical containing 2 to 8 carbon atoms. Preferred glycols are those of the formula $HO(CH_2)_xOH$ wherein $x$ is 4 to 8. Molar ratios of more than 1 mole of glycol to acid are preferred so as to insure linear chains containing a preponderance of terminal hydroxyl groups. The polyesters have a molecular weight of about 600 to 2000.

The hydroxyl (polyalkylene oxide)s, or polyethers, are essentially linear hydroxy-terminated compounds having ether linkages as the major linkage joining carbon atoms, such as those polyethers prepared by the cleavage of a cyclic ether with a Lewis acid. They have a formula $HO[(CH_2)_nO]_xH$ wherein $n$ is a number from 2 to 6 and $x$ is an integer.

The polyacetals are generally prepared by the reaction of an aldehyde and polyhydric alcohol with an excess of the alcohol, including for example, the reaction products of aldehydes such as formaldehyde, and the like, reacted with glycols, such as ethylene glycol, and the like, which are well known to those skilled in the art.

The molar ratio of the reactants is maintained so that the reaction product has essentially no free hydroxyl or isocyanate groups. About 1 mole of reactant (1) is reacted with from about 0 to 15, preferably from 0.1 to 10 moles of free glycol reactant (2) and the amount of diisocyanate (3) is varied from about 1.0 to 16 moles, preferably from 1.1 to 11 moles, but preferably in ratios so that the number of equivalents of isocyanate will balance the available equivalents of hydroxyl.

The free glycol chain extender, polymeric reactant and organic diisocyanate may be admixed directly if they are in the liquid state, melt mixed if both or either of them are solids, or added to a solvent for subsequent solution polymerization. Although any free glycol can be used, typical free glycol compounds are aliphatic glycols, such as ethylene glycol, 1,4-butanediol, and the like; the cycloaliphatic glycols, and glycols containing an aryl group.

Typical diisocyanate compounds employed are the aliphatic diisocyanates, such as tetramethylene diisocyanate, hexamethylene diisocyanate and the like; the cycloaliphatic diisocyanates, such as cyclohexyl diisocyanate and the like; the aromatic diisocyanates, such as the phenyl diisocyanates, the toluene diisocyanates and the like; the dicycloaliphatic diisocyanates, such as dicyclohexyl methane diisocyanate and the like; and the diaryl diisocyanates, such as diphenyl methane-p,p'-diisocyanate, dichloro-diphenyl methane diisocyanate, dimethyl diphenyl methane diisocyanate, diphenyl dimethyl methane diisocyanate, dibenzyl diisocyanate, diphenyl ether diisocyanate and the like.

The essentially linear polyesterurethanes are prepared as taught in U.S. Pat. 2,871,218. Materials of this type are available from B. F. Goodrich Chemical Company under the designation Estane 5701. The essentially linear polyetherurethanes are prepared as taught in U.S. Pat. 2,899,411. A material of this nature is available from B. F. Goodrich Chemical Company under the designation Estane 5714.

Block SBR polymers are also useful matrix materials for the practice of this invention. These polymers may have the chain configuration A–B–A. They are totally blocked copolymers with styrene (A) usually present in blocks of more than 10 units. They are solution polymerized SBR with good elastic properties in the uncured state. Block polymerized SBR is thermoplastic and has high green strength. These polymers may be prepared by placing the monomer for block A in a reactor with a hydrocarbon diluent such as toluene. When the monomer is all consumed, type B monomer is added and polymerized. More type A monomer is finally injected and polymerized to complete the chain. Polymerization is initiated by organolithium catalyst such as n-butyllithium and is usually conducted at 20°–65° C. The first terminal block usually has an average molecular weight between about 2,000 and 100,000. Monomer B for the elastic midsection is added, and temperature, initiator concentrations, etc. are adjusted to optimize polymerization of monomer B. Upon exhaustion of available monomer B, more monomer A is added and polymerized to complete the chain configuration A–B–A. Block SBR copolymers are available under the trade names Shell ST–125 and Shell ST–200.

Plasticized polyvinyl chloride is another species of useful, thermoplastic polymer for use in the practice of this invention. Typical of these materials is a solid, thermoplastic compound prepared from a plastisol wherein the polyvinyl chloride resin is dissolved in one or a mixture of plasticizers. The physiologically active agent is dissolved in the plastisol with stirring; the mix is cast to any desired form and shape, and the composition is fused and solidified by heating. A soft, flexible, dry thermoplastic solid with rubbery characteristics is obtained. Typical polyvinyl chloride resins are Geon 121, Geon 124, Geon 126 and Geon 128 marketed by B. F. Goodrich Chemical Company. These resins vary slightly in particle size and in viscosity and gel point, and are all useful in the invention. Plasticizers used to form the plastisols with the resins include dioctyl phthalate, dioctyl adipate, di(2-ethylhexyl) phthalate and tricresyl phosphate.

Other typical linear thermoplastic polymers which may be employed in the practice of this invention include polyacrylates, polyacetates, polybutyrates, polyamides, and polyethylene.

The invention may be utilized to provide drug implants in solid state configurations containing any desired medical or pharmaceutical type agent: for example, an antiineffective such as an antibacterial, i.e., sulfathiazole; an antibiotic, i.e., penicillin; an antifungal agent; i.e., Nystatin; an antimalarial, i.e. atabrine and an antiprotozoan, i.e., hydroxystilbamide isothionate. Cardiovascular agents, which include digitalis, quinidine and nitroglycerine, and contraceptives, for instance spermicidal agents such as hexylresorcinol, may also be utilized in accordance with the present invention. Hormones and the synthetic substitutes and antagonists as represented by the thyroid hormones and by insulin may be used with beneficial results. Immunological agents including, for example, tetanus toxoid, renal acting agents, for example, acetazolamide, skeletal muscle relaxants and their antagonists, for example, Mephenesin, central nervous system stimulants, for example, ephedrine; and central nervous system depressants, which include the barbiturates in all their various chemical modifications are also included in the scope of the invention. Anesthetics which may be used in the novel drug carrier, include procaine, an antihistamine, i.e., benadryl; a detoxicant, dimercaprol; an enzyme, i.e., hyaluronidase and an agent affecting blood formulation, i.e., liver extract. A radioactive isotope which may be included in the novel carrier is iodine 131-tagged albumen. Specific proteins find utility in accordance with the invention, as represented by gamma globulin.

Examples of additional drugs which may be included in the present drug carriers with beneficial results in accordance with this invention include adrenal corticotrophic, hormone, adrenal cortical hormones, such as aldosterone, desoxycorticosterone, hydrocortisone and cortisone; parathromone, pituitrin, estrodiol, progesterone, testosterone, and melengestrol acetate (MGA).

In the broadest aspect this invention is believed to be directed to the phenomenon of diffusion in which a dispersed or dissolved physiologically active agent migrates from the interior of a polymeric matrix and through the polymer surface at a relatively low rate. The mechanism of this diffusion or migrating action may be a gradient system in which the dispersed substance relieves its internal concentration by spreading out of its matrix into the adjacent medium, body tissues, for example. This action would ordinarily cease when sufficient substance has reached the outer surface of the adjacent medium. In the practice of the invention the migrant molecules are removed from the outer surface of the polymer by body fluids and by tissue absorption. The migration continues until the migrant active agent is almost completely consumed, or until the implant is removed by a reversal of the implant operation. The active agents which are capable of migrating through the polymer matrix surface show an apparent appreciable solubility in the thermoplastic polymer. Drug molecules included in the polymer matrixes have a definite or characteristic rate of migration through the polymer surface, which can establish the dosage rate and amount of drug that is released from a given surface in a given time interval. The amount of drug released over a period of time is based on the rate at which the drug migrates through the polymer and on the ability of the living tissues surrounding the implant to absorb the drug.

The implants are readily prepared in solid forms of given shapes, concentrations, and volumes and thereby can have a calibrated release rate for a given drug. Implant formulations as uniform, continuous drug dispensing surfaces can readily be made available to the medical and surgical professions as standard dispensing units. Virtually any desired shape and volume of implant can be produced by techniques known in the art.

Solid drugs are readily mixed with solid polymers by known mixing techniques such as mill mixing. It is also possible to add liquid drugs to a solid polymer which is banding on a mill. Polyvinyl chloride is available as a solid powder useful for mill mixing and in a fluid form known as an organosol or plastisol when combined with large amounts of plasticizer. Liquid and solid drugs can be added to the polymer in this plastisol form by pouring and stirring steps. The suspension is formed into shape by casting and fusing it in glass or other removable mold materials. The molded solid may be cut to the desired length to form implant pellets. Solid mixtures of drug and polymer are readily granulated, extruded to solid shape and cut to desired length.

While the invention has been described in conjunction with certain drugs and implant structures, it will be realized that these materials and structures may be varied without departing from the spirit and scope of the invention, which is the method and means of introducing medically active agents into the body from a polymeric implant over a prolonged period. The drugs and thermoplastic polymeric carrier can be varied to provide various dosage rates of selected drugs that fulfill a large number of physiological and therapeutic requirements. Other variations which do not depart from the spirit of the invention will occur to those skilled in the art.

EXAMPLE I

The thermoplastic polymer base for an implant is an essentially linear polyetherurethane (Estane 5714, B. F. Goodrich Chemical Company), specific gravity 1.11, durometer A hardness 80, 300% modulus 1100 p.s.i., low temperature brittleness below —80° F., viscosity (15% T. S. in tetrahydrofuran, Brookfield RVF viscometer No. 2 spindle, 20 r.p.m., 25° C.) 1000 cps., solubility in normal saline solution less than 0.1%. The polymer is banded on a rubber mill and the physiologically active agent, a steroid hormone, melengestrol acetate (MGA), is carefully milled in. In the quantities used the MGA apparently dissolves in the polymer. It cannot be detected under a 200 power polarizing microscope. The polymer-active agent blend is sheeted to ⅛" thickness, cut in strips and chopped to approximately ⅛" cubes. These cubes are fed to an extruder and shaped into ¼" diameter cylindrical rods. Finally the rods are cut to give solid implant structures having 1000 mm.² surface area.

The implant structures are each placed in the neck of a fertile heifer for a period of 21 days. The heifers are observed daily to see if estrus and ovulation occur. If so, the comment "yes" is entered under Broke treatment. If the comment is "no," then an Observation is made as to how many days after removal of the implant estrus (E) and ovulation (O) do occur. Data are set forth in Table 1.

TABLE 1

| Ingredient | Parts by weight | | Control |
|---|---|---|---|
| Polyetherurethane | 100 | 100 | 100 |
| MGA | 6.06 | 3.33 | 0 |
| MGA/implant—wt. percent found by spectrophotometric analysis | 5.82 | 3.27 | 0 |
| MGA release rate (mg./day over 21 days) | 0.34 | 0.31 | 0 |
| Broke treatment (failure to prevent estrus) | No | No | Yes |
| Observation after removal: E=estrus; O=ovulation | EO | EO | |
| Days after removal to occurrence of estrus | 3 | 3 | |
| Comment | (a) | (a) | | a Next cycle normal.

EXAMPLE 2

The thermoplastic polymer employed is an essentially linear polyesterurethane (Estane 5701, B. F. Goodrich Chemical Company). This material has tensile strength 5800 p.s.i., 300% modulus, 1300 p.s.i., elongation 500%, sp. gr. 1.2, durometer A hardness 88, solubility in normal saline solution less than 0.1%.

TABLE 2

| Ingredient | Parts by weight | | Control |
|---|---|---|---|
| Polyesterurethane | 100 | 100 | 100 |
| MGA | 5.56 | 3.06 | 0 |
| MGA/implant—weight percent found spectrophotometric analysis | 5.51 | 3.00 | 0 |
| MGA release rate (mg./day over 21 days) | 0.23 | 0.11 | 0 |
| Broke treatment | No | No | Yes |
| Observation after removal | EO | EO | |
| Days after removal to occurrence of estrus | 4 | 3 | |
| Comment | (a) | (a) | |

(a) Next cycle normal.

EXAMPLE 3

The thermoplastic polymer employed is a block SBR polymer (Shell ST–125, Shell Chemical Company). This material has low temperature brittleness point of —80° F., Gehman freeze point of —24° F., and solubility in normal saline solution less than 0.1%.

The mixing and testing procedures of Example 1 are followed. Data are set forth in Table 3.

TABLE 3

| Ingredient | Parts by weight | | Control |
|---|---|---|---|
| Block SBR | 100 | 100 | 100 |
| MGA | 7.09 | 3.90 | 0 |
| MGA/implant—weight percent found spectrophotometric analyses | 7.45 | 3.87 | 0 |
| MGA release rate (mg./day for 21 days) | 0.43 | 0.27 | 0 |
| Broke treatment | No | No | Yes |
| Observation after removal | EO | EO | |
| Days after removal to occurrence of estrus | 3 | 6 | |
| Comment | (a) | (b) | | a EO 60 days later.
b EO 70 days later.

EXAMPLE 4

The thermoplastic polymer employed is a polyvinyl chloride homopolymer, fine particle, emulsion polymerized, in the form of a plastisol with solubility in normal saline solution less than 0.1%. Geon resin 128 (B. F. Goodrich Chemical Company) is suspended in dioctyl phthalate in the ratio 100/60, resin/plasticizer. This is a fluid mixture and the MGA is blended in by stirring. The mix is poured into ¼ inch I.D. glass tubes, fused by heating for 15 minutes at 350° F., and then cooled to room temperature where it solidifies. When the glass tube is removed, the polymer-MGA rod is cut and handled in the same manner as are the mixtures of Examples 1–3.

Testing procedures are the same as in Example 1. Data are set forth in Table 4.

TABLE 4

| Ingredient | Parts by weight | | Control |
|---|---|---|---|
| Polyvinyl chloride | 100 | 100 | 100 |
| MGA | 5.81 | 3.20 | 0 |
| MGA/implant—weight percent found spectrophotometric analysis | 4.43 | 2.69 | 0 |
| MGA release rate (mg./day over 21 days) | 0.48 | 0.26 | |
| Broke treatment | No | No | Yes |
| Observation after removal | EO | EO | |
| Days after removal to occurrence of estrus | 3 | 2 | |
| Comment | (a) | (b) | | a Next cycle normal.
b EO 40 days later.

I claim:

1. A flexible fertile heifer estrus-blocking neck implant for releasing a physiologically active estrus-blocking progestational steroid hormone agent in the neck tissue of a fertile heifer comprising a solid essentially linear polyetherurethane polymeric matrix, said matrix in the form of a solid cylindrical rod implant having 1000 sq. mm. area, and holding about 3% to about 6% by weight of said agent apparently dissolved in the polymer and, after being placed in contact with said heifer neck tissues, releasing said estrus-blocking progestational steroid hormone agent to said heifer neck tissues at a sustained rate of about 0.31 to 0.34 milligram per day over 21 days, estrus and ovulation to occur 3 days after removal of said implant.

2. The fertile heifer estrus-blocking neck implant of claim 1 wherein said active estrus-blocking progestational steroid hormone agent is melangestrol acetate.

(References on following page)

References Cited

UNITED STATES PATENTS

| | | | |
|---|---|---|---|
| 3,117,966 | 1/1964 | Petrow | 260—239.55 |
| 3,545,439 | 12/1970 | Duncan | 128—130 |
| 3,499,445 | 3/1970 | Reed | 128—260 |
| 3,565,991 | 2/1971 | Short | 424—243 |
| 3,428,729 | 2/1969 | Anderson et al. | 424—19 |
| 2,625,158 | 1/1953 | Lee et al. | 128—260 |
| 2,413,419 | 12/1946 | Saunders et al. | 424—22 |
| 3,214,338 | 10/1965 | Ehrlich | 424—78 |
| 3,618,213 | 11/1971 | Shepherd et al. | 32—2 |
| 3,166,472 | 1/1965 | Menn et al. | 424—78 |
| 3,318,769 | 5/1967 | Folckemer et al. | 424—78 |

OTHER REFERENCES

Kincl et al.: Steroids 11 (5): 673–680 May 1968 "Sustained Release Hormonal Preparations 1. Diffusion of Various Steroids Through Polymer Membranes."

SHEP K. ROSE, Primary Examiner

U.S. Cl. X.R.

128—260; 424—19, 78, 81, 82, 83, 243